United States Patent
Takei

[19]

[11] Patent Number: 6,061,101
[45] Date of Patent: May 9, 2000

[54] DIGITAL COLOR SIGNAL MODULATING APPARATUS

[75] Inventor: Akihiro Takei, Miyazaki, Japan

[73] Assignee: Oki Electric Industry Co., Ltd., Tokyo, Japan

[21] Appl. No.: 08/864,673

[22] Filed: May 28, 1997

[30] Foreign Application Priority Data

May 29, 1996 [JP] Japan ................................. 8-157726

[51] Int. Cl.[7] .............................. H04N 9/65; H04N 9/66; H04N 9/77; H04N 5/40
[52] U.S. Cl. ......................... 348/642; 348/638; 348/639; 348/663; 348/724
[58] Field of Search ................................... 348/642, 663, 348/708, 638, 639, 713, 728, 724, 660, 662, 493

[56] References Cited

U.S. PATENT DOCUMENTS

| | | | |
|---|---|---|---|
| 4,709,257 | 11/1987 | Suzuki | 348/639 |
| 4,956,701 | 9/1990 | Shioda | 348/642 |
| 5,242,415 | 9/1993 | Mimura | 348/642 |
| 5,638,135 | 6/1997 | Mukai | 348/642 |
| 5,870,152 | 2/1999 | Fukatsu | 348/642 |

FOREIGN PATENT DOCUMENTS

| | | | |
|---|---|---|---|
| 62-143588 | 6/1987 | Japan | H04N 9/65 |
| 2-14695 | 1/1990 | Japan | H04N 11/04 |
| 4-168481 | 6/1992 | Japan | H04N 11/14 |
| 5-030523 | 2/1993 | Japan | H04N 9/64 |
| 8-195965 | 7/1996 | Japan | H04N 9/65 |
| 2 262 857 | 6/1993 | United Kingdom | H04N 11/04 |

*Primary Examiner*—Vu Le
*Attorney, Agent, or Firm*—Rabin & Champagne, P.C.

[57] ABSTRACT

An apparatus to modulate the digital color signal using a simple circuit that utilizes neither multiplier nor ROMs to multiplying a sine wave and cosine wave. The digital color signal modulating apparatus includes a first selector, a second selector 3, and a third selector. The first selector and the second selector provide the U signal component and the V signal component of the digital color signal to the third selector at a half cycle, rate respectively. The third selector alternately selects one of those signals, which is combined with the sub-carrier wave. For both modulations with the sine wave and with the cosine wave, the input signal is inverted and the fourth selector selects the outputs of the through path and the inversion path in turn, thus producing the modulated outputs.

13 Claims, 12 Drawing Sheets

DIGITAL COLOR SIGNAL MODULATING APPARATUS

BACKGROUND OF THE INVENTION

The present invention relates to a digital color signal modulating apparatus that modulates a digital color signal to convert digital color image data to an analogue signal for a common color television set.

Color image processing circuit operating in digital computers have employed a R (red) signal, a G (green) signal, and a B (blue) signal, which are combined to express a color image. On the contrary, the color television set has employed a luminance signal, and a chrominance signal, which are combined to be transmitted with a radio wave, and more specifically employs the luminance signal (Y signal), and difference signals to represent the differences between each component of the chrominance signal and the luminance signal. For transmission to the color television set, the signals processed in the computer require a change in signal form. In this case the following signal components are in advance: calculated a U signal component, which denotes the B signal component minus the Y signal component, and a V signal component, which denotes the R signal component minus the Y signal component. The U signal component is modulated with a sine wave, while the V signal component is modulated with a cosine wave. The two signal components are transmitted to the color television set after addition thereof.

Incidentally, the conventional digital color signal modulating apparatus described above has a problem as follows. To modulate the U signal component in the digital color signal with the sine wave, as well as to modulate the V signal component with the cosine wave, there requires a circuit for receiving the U and V signal components, and for multiplying these signal components and those waves, respectively. This necessitates a ROM (Read Only Memory) to store a sine value and another ROM to store a cosine value to execute the trigonometric function.

Furthermore, the multiplication depends upon the clock signal in the computer. In order to perform the multiplication at the same frequency as the predetermined frequency of the color sub-carrier wave, there must be various ROMs suitable for various clock frequencies in various computers; namely, each of the ROMs must provide the specific values of the trigonometric function independent of the respective clock frequency. Therefore, some sorts of the ROMs are essential for applications to various computers having different clock frequencies.

Consequently, a ROM used in a digital color signal modulating apparatus differs from another ROM involved in another digital color signal modulating apparatus, and further those ROMs differs from still another ROM in still another digital color signal modulating apparatus; in short, the types of digital modulating apparatus increase with the types of ROMs corresponding to the various clock frequencies.

On the contrary, a digital color signal modulating apparatus capable of working at various clock frequencies requires the various ROMs, thereby being prone to enlargement.

SUMMARY OF THE INVENTION

The object of the present invention is to provide a digital color signal modulating apparatus which can modulate a digital color signal without multiplication and trigonometric functions.

According to an aspect of the present invention, the digital color signal modulating apparatus comprises a first selector for selecting one of a U signal component and first color burst signal; a second selector for selecting one of a V signal component and a second color burst signal; a third selector for alternately selecting one of the outputs of the first selector and the second selector at a first frequency that is twice as high as a second frequency of a color sub-carrier wave; a through path for forwarding the output of the third selector; an inversion path for inverting the polarity of the output of the third selector in terms of analogue; and a fourth selector for alternately selecting one of the outputs of the through path and the inversion path at the second frequency.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENTS

Hereinafter, preferred embodiments of the present invention will be described.

First Embodiment

Figure 1:
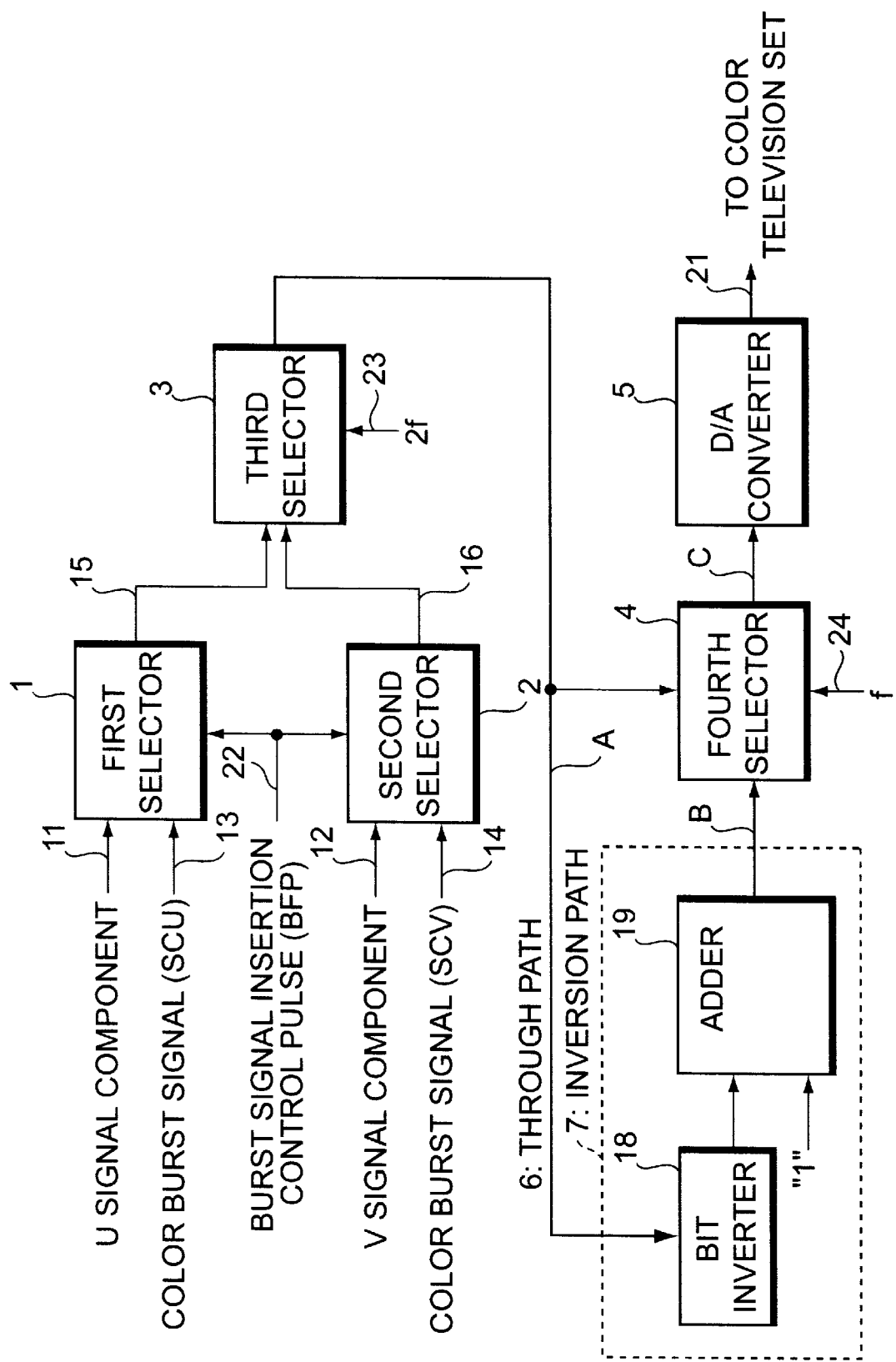
FIG. 1 is a block diagram showing the digital color signal modulating apparatus of the first embodiment.

FIG. 1 is a block diagram showing the digital color signal modulating apparatus of the first embodiment. The apparatus comprises a first selector 1 and a second selector 2; a third selector 3 to select one of signals provided therefrom; and a fourth selector 4 to generate a modulated digital color signal, as shown in FIG. 1. The output signal from the fourth selector 4 is applied to a video terminal of a color television set (not shown) after conversion into analogue by the D/A (Digital/Analogue) converter 5. The input timing of the digital color signal is controlled by a control clock signal that is four times as high as the frequency of the color sub-carrier wave.

To the first selector 1 receives a U signal component 11 of the digital color signal and a color burst signal SCU 13 for the U signal component. The first selector 1 selectively provides to the third selector 3 via the output line 15 one of the U signal component 11 and the color burst signal 13 under control of the burst signal insertion control pulse BFP 22. The color burst signal 13 is inserted during one blanking period lying in every horizontal scanning period of the color television signal. The burst signal insertion control pulse BFP controls the switching of the first selector 1 at the insertion timing of the color burst signal 13.

The second selector 2 receives the V signal component 12 of the digital color signal and the color burst signal SCV 14 for the V signal component, to selectively provide one of those two signals to the third selector 3 via the output line 16, wherein the second selector 2 is under control of the burst signal insertion control pulse BFP 22 similarly to the first selector 1.

The third selector 3 alternately generates the output signal of the first selector 1 and the output signal of the second selector 2 periodically, wherein the selection is controlled by the control signal 23 so as to realize a switching rate that is twice as high as the frequency of the color sub-carrier wave 24.

Between the third selector 3 and the fourth selector 4 are laid the through path 6 and the inversion path 7, in parallel. The through path 6 includes the line to forward the output signal of the third selector 3 to the fourth selector 4. Also, the inversion path 7 includes the bit inversion unit 18 and the adder 19 to add "1" to the output signal therefrom, as shown in FIG. 1. The inversion path 7 inverts the bits of the input digital color signal and adds "1" to the inverted signal, which provides the output signal with a polarity opposite to that of the input signal in terms of analogue. This produces a sine wave and a cosine wave as described later.

The fourth selector 4 selectively generates one of the output signals received from the through path 6 and the inversion path 7 periodically. The control signal 24 for controlling the fourth selector 4 has the same frequency as that of the color sub-carrier transmitted for color television, which provides the modulated digital color signal.

Figure 2:
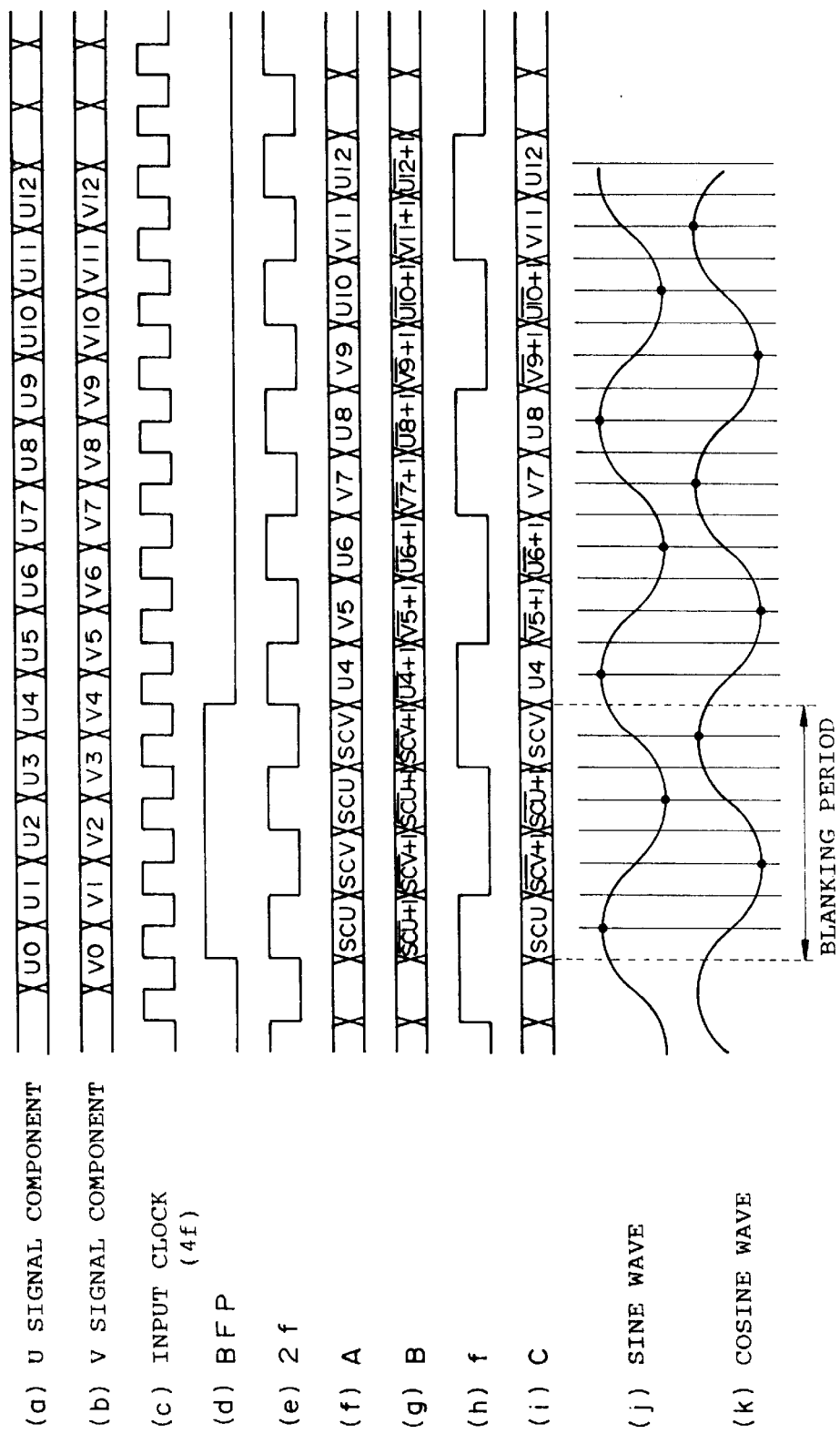
FIG. 2 is a time chart showing the operation of the digital color signal modulating apparatus of the first embodiment.

FIG. 2 is a time chart showing the operation of the digital color signal modulation apparatus of the first embodiment, where reference symbol (a) denotes the U signal component of the digital color signal received by the first selector 1; (b) the V signal component of the digital color signal received by the second selector 2; (c) the input clock signal to control the digital color signal, which is set to be four times as high as the frequency f of the sub-carrier wave in the color television set; (d) burst signal insertion control pulse BFP, which maintains a high level during the forefront specific part of every horizontal scanning period; (e) the clock signal that is twice as high as the frequency of the sub-carrier wave, which controls the third selector 3; (f) the output signal A of the through path 6; (g) the output signal B of the inversion path 7; (h) a control signal having the same frequency as that of the sub-carrier wave; (i) the output signal C of the fourth selector 4; (j) the sine wave which should be originally multiplied by the U signal component; and (k) the cosine wave which should be originally multiplied by the V signal component.

As shown in FIGS. 2(a),(b), and (c), the U signal component and the V signal component are provided in synchronization with the input clock signal as their values change, wherein the values are composed of several bits representing a level of the digital color signal.

As shown in FIG. 2(d), maintaining a "1" level for the burst signal insertion control pulse BFP, which is preset to "0", during a blanking period allows the first selector 1 and the second selector 2 to selectively output generate the U signal component SCU 13 and the V signal component SCV 14, both of which are color burst signals. The third selector 3 alternately selects these input color burst signals 12 and 14 at a frequency that is twice as high as that of the color sub-carrier waves, thereby producing the signal A shown in FIG. 2(f). The signal A is fed to the fourth selector 4 via the through path 6, while being converted into the signal B by the inversion path 7, as shown in FIG. 2(g). Similarly to the signal A, the signal B, which is the signal with a polarity opposite that of the signal A in terms of analogue, is also fed to the fourth selector 4.

The fourth selector 4 selectively generates the output signal A of the through path 6 and the output signal B of the inversion path 7 at the frequency of the color sub-carrier waves, as shown in FIG. (h), whereby during the blanking period, the burst signal SCU of the U signal component is provided first, the burst signal SCV+1 which is the inverse of the signal SCV is provided second, the signal SCU+1 which is the inverse of to the burst signal SCU is provided third, and then the signal burst signal SCV is finally provided. As a result, analogue values corresponding to the outputs SCU and SCU+1 constitute the maximum and minimum values of a sine wave, while the analogue values of the outputs SCV+1 and SCV constitute those of a cosine wave, as shown in FIGS. 2(j) and (k). Smoothing those values provides a multiplication of the U signal component by the sine wave and another multiplication of the V signal component by the cosine wave.

After expiration of the blanking period, the U signal component and the V signal component are fed to the third selector 3 via the first selector 1 and the second selector 2. This produces the values corresponding to the peaks of the sine wave and cosine wave with their polarities changing in turn.

In summary, the first selector 1 and the second selector 2 serve to insert the color burst signal at a proper timing; the third selector 3, the through path 6, and the inversion path 7 extract the peak values, each of which has the plus and minus polarities of the sine and cosine waves; and the fourth selector 4 alternately selects the outputs of the through path 6 and the inversion path 7, thus producing the modulated digital color signal.

As described above, alternate selecting based on the frequency of the color sub-carrier wave of the original U signal component SCU, the original V signal component SCV, and the signals SCU+1 and SCV+1 inverse thereto produces the modulated digital color signal, using no multiplier and no ROM for providing a trigonometric function in use therefor.

Figure 3:
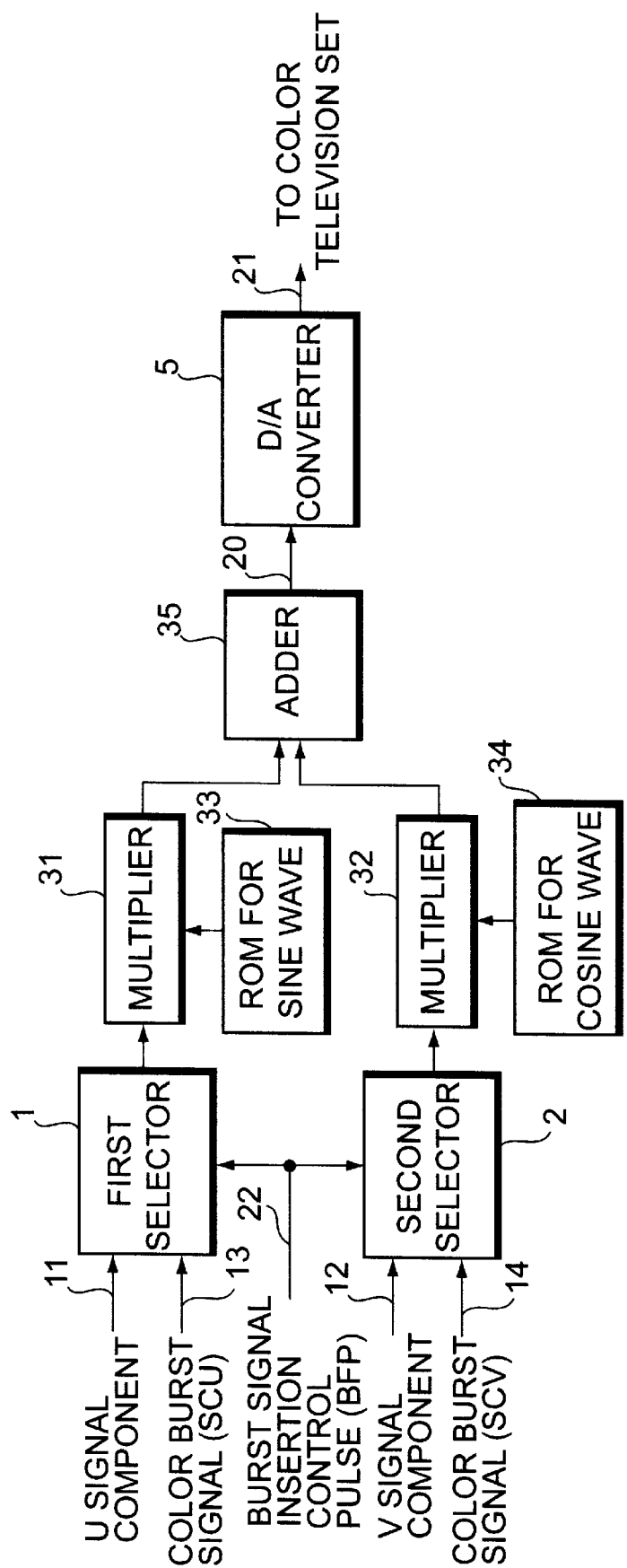
FIG. 3 is a block diagram showing a comparative example.

FIG. 3 is a block diagram of a comparison embodiment showing the effect of the first embodiment. The block diagram shows a conventional circuit for modulation. Similarly to the first embodiment, the circuit includes the first selector 1 and the second selector 2. The first selectors 1 and 2 output signals to the multipliers 31, 32 respectively, wherein the U signal component is multiplied with the ROM 33 output to produce the sine wave, while the V signal component is multiplied with the ROM 34 output to produce the cosine wave. The adder 35 adds the output of the multiplier 31 and the output of the multiplier 32, thus completing modulation of the digital color signal.

As shown in FIG. 3, the circuit requires the multipliers 31 and 32, which are rather complicated in most cases, and the ROMs provided the trigonometric function used therefor; in particular, the ROMs 33 and 34 store data only according to a clock signal having a predetermined frequency. Accordingly, such a circuit is prone to increase the complexity of the configuration, as well as requiring the ROMs for the trigonometric function, each of which must be suited for the respective clock frequencies.

Second Embodiment

Figure 4:
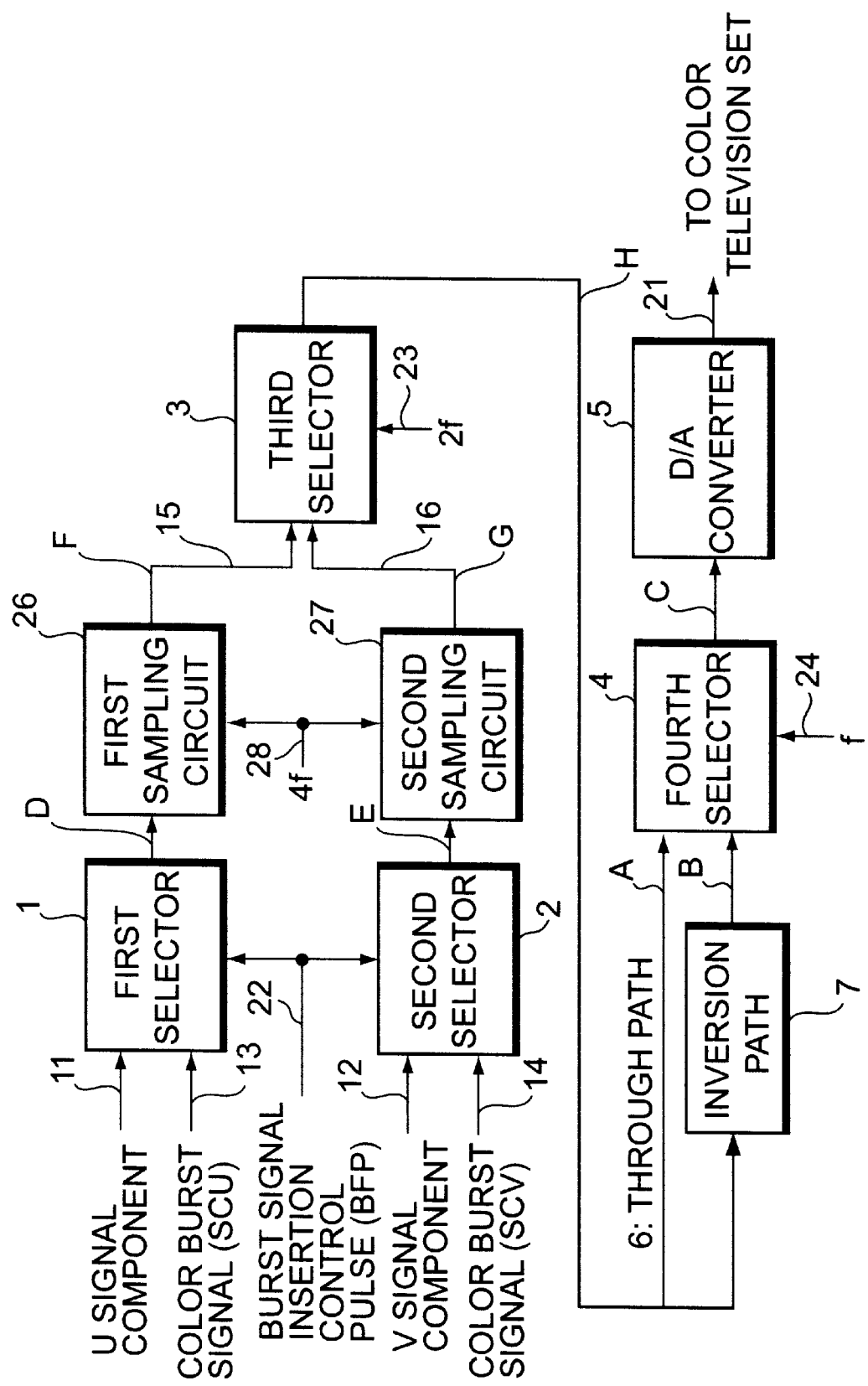
FIG. 4 is a block diagram showing the digital color signal modulating apparatus of the second embodiment.

FIG. 4 is a block diagram showing the color signal modulating apparatus of the second embodiment of the present invention. Hereinafter, the same reference numerals as those of the first embodiments denote the same components as those thereof. The apparatus further comprises sampling circuits 26 and 27 respectively behind disposed after the first selectors 1 and 2, and before the third selector 3, which receives the outputs thereof. The sampling circuit 26 samples the output of the first selector 1 at a frequency that is four times as high as that of the color sub-carrier wave, while the sampling circuit 27 samples the output of the second selector 2 in the same fashion. The apparatus leaves the digital color signals, which are fed to the first and second selectors 1 and 2, controlled under an arbitrary clock signal; because sampling circuits 26 and 27 each sample at the frequency that is four times as high as that of the color sub-carrier wave, sampled signals are thereby provided to the third selector 3. This enables processing of the output from the third selector 3 to take place as in the first embodiment. Consequently, the apparatus can process the digital color signal which depends on clock signals having the arbitrary frequencies.

Figure 5:
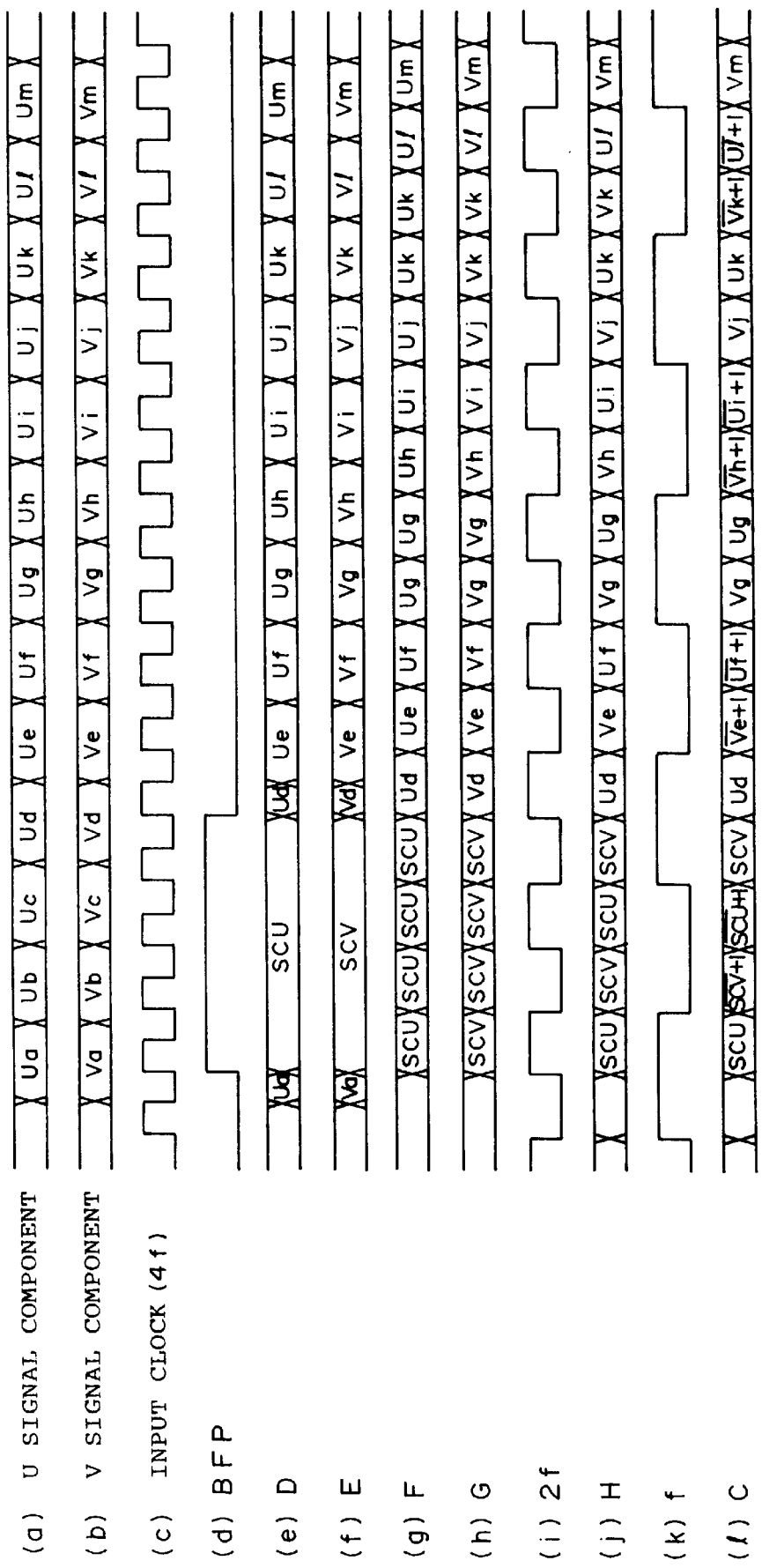
FIG. 5 is a time chart showing the operation of the digital color signal modulating apparatus of the second embodiment.

FIG. 5 is a time chart showing the operation of the second embodiment, in which reference symbols (a) and (b) denote the U signal component and the V signal component of the digital color signals provided respectively to the first selector 1 and the second selector 2, wherein the signal components enter at a frequency different from a frequency that is four times as high as that of the color sub-carrier wave; (c) the signal having a frequency that is four times as high as that of the color sub-carrier wave; (d) the burst signal insertion control pulse; (e) the output D of the first selector 1; (f) the output E of the second selector 2; (g) the output F of the sampling circuit 26; (h) the output G of the sampling circuit, 27; (i) the signal having frequency that is twice that of the color sub-carrier wave; (j) the output H of the third selector 3; (k) the signal having a frequency that is the same as that of the sub-carrier wave; and (l) the output C of the fourth selector 4.

Though the signals received by the first selector 1 and the second selector 2 do not synchronize with the frequency of the color sub-carrier wave as shown in FIGS. 5(*e*), (*f*), and (*k*), the signals F and G having the frequency twice that of the color sub-carrier wave are provided to the third selector 3 by the sampling circuits 26 and 27, as shown in FIGS. 5(*g*) and (*h*). After that, the same procedure as that of the first embodiment follows, thus producing the signal shown in FIG. 5(*l*).

According to the second embodiment, even in the case that the input digital color signal having arbitrary frequencies does not synchronize with the sub-carrier wave, the apparatus can modulate the digital color signal, which makes the apparatus universal for various modulations.

Third Embodiment

Figure 6:
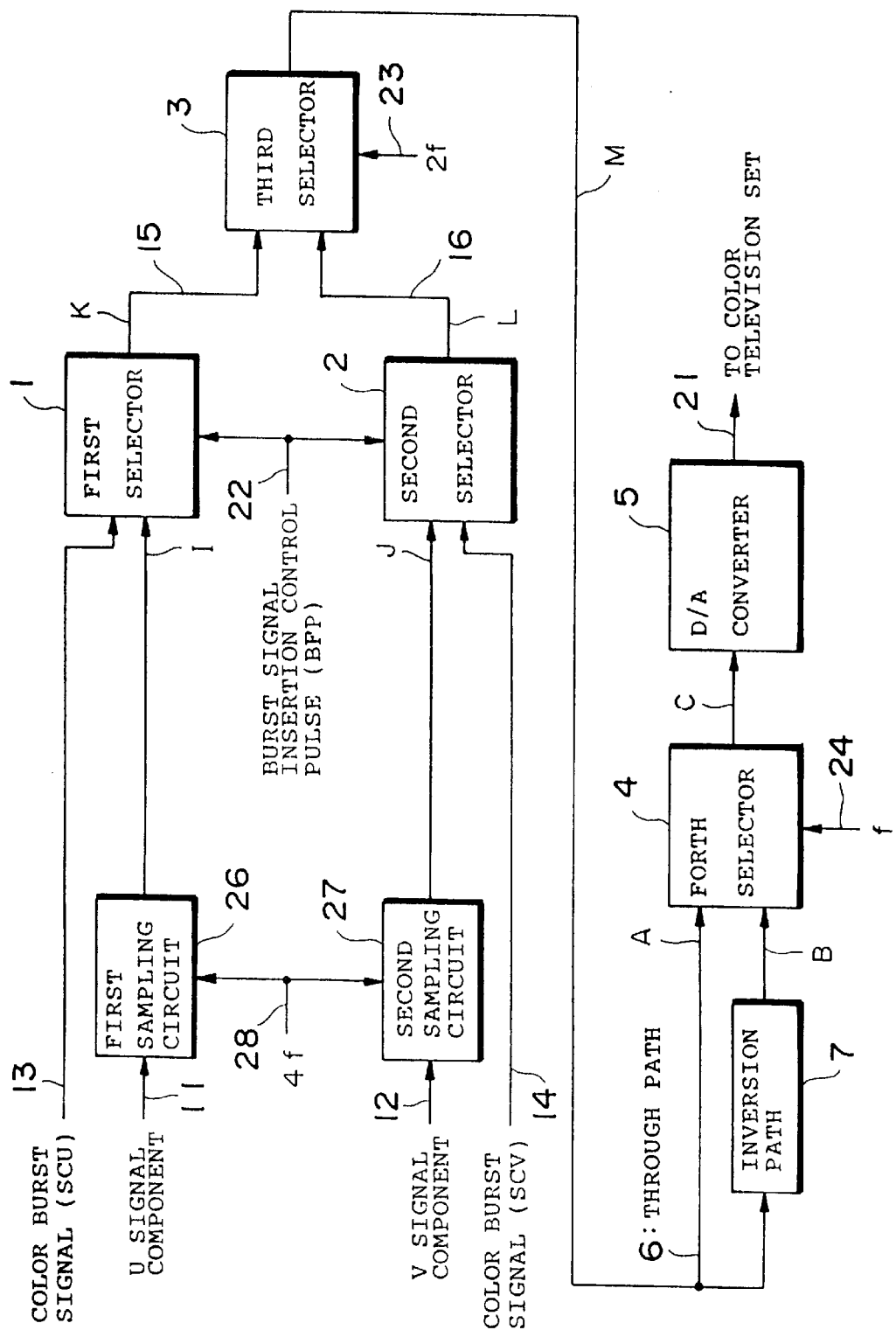
FIG. 6 is a block diagram showing the digital color signal modulating apparatus of the third embodiment.

FIG. 6 is a block diagram showing the digital color signal modulating apparatus of the third embodiment. Hereinbelow, the same reference numerals as those of the second embodiment represent the same components as those thereof. In the apparatus, the sampling circuits 26 and 27 are positioned before the first selectors 1 and 2, respectively. The first selector 1 receives from the first sampling circuit 26 the output which is sampled thereby, and selectively provides it according to specific timing. Furthermore, the burst signal insertion control pulse 22*a* is provided to the first selector 1 independent of the sampling circuit 26, which is a kind of the digital signal with a specific value to indicate a certain level of the color burst signal. The pulse may be provided to the third selector 3 directly because the value is kept constant apart from the clock signal. That is why the first sampling circuit 26 is positioned prior to the input terminal of the U signal component of the first selector 1. The sampling circuit 27 located before the second selector 2 also works in the same manner.

Figure 7:
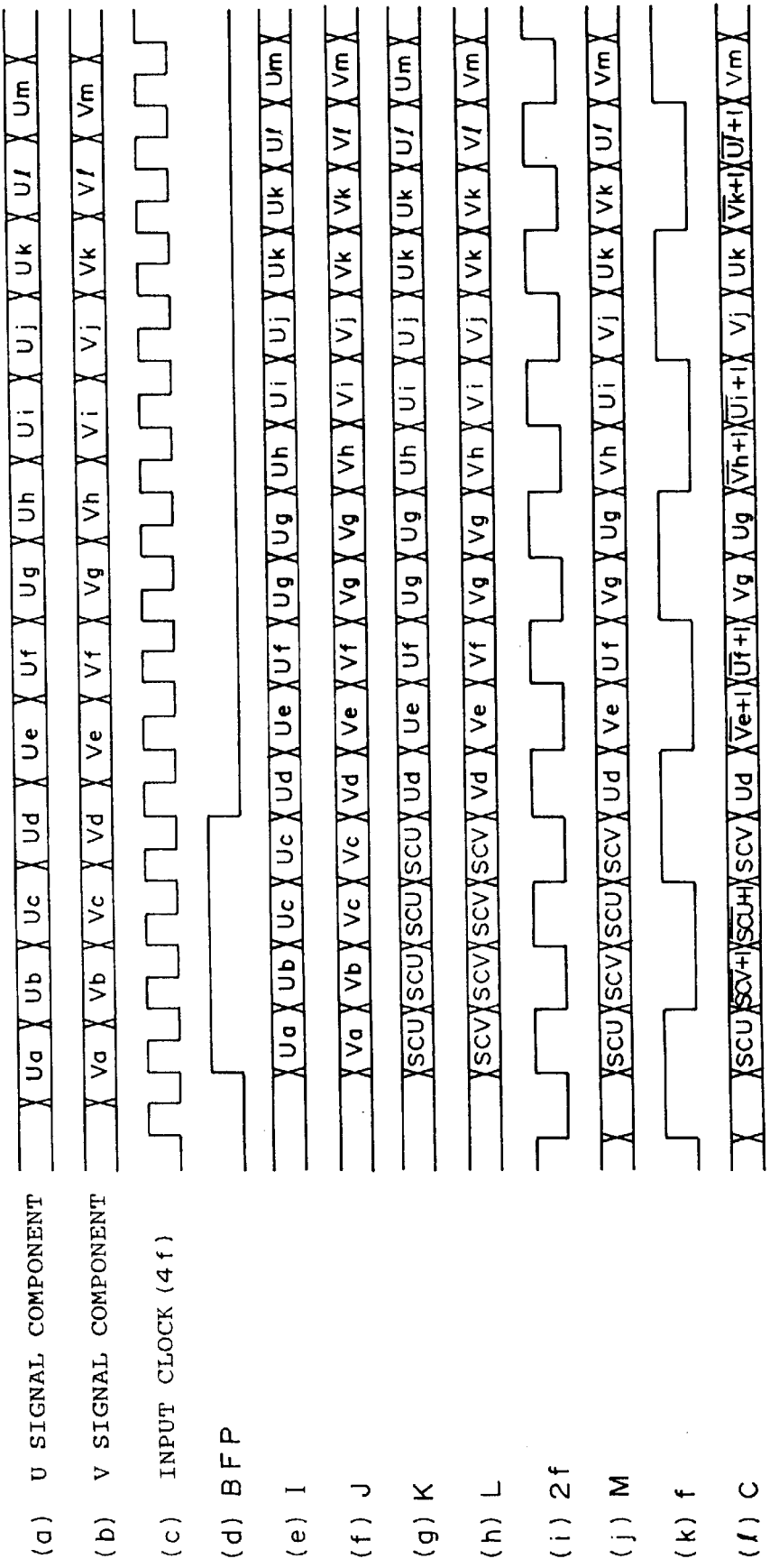
FIG. 7 is a time chart showing the operation of the digital color signal modulating apparatus of the third embodiment.

FIG. 7 is a timing chart showing the operation of the digital color signal modulating apparatus of the third embodiment, where reference symbols (a)–(d),(i),(k), and (n) denote the same signals as those in the second embodiment; (e) the output I of the sampling circuit 26; (f) the output J of the sampling circuit 27; (g) the output K of the first selector 1; (h) the output L of the second selector 2; and (j) the output M of the third selector 3. The color burst signal controlling in the signal generation to the third selector 3 is not sampled, that is does not produce a frequency component; this differs from the second embodiment. However, the signal which the third selector 3 selects and the fourth selector provides is similar to that of the first embodiment.

According to the third embodiment, modulation of the input digital color signal with an arbitrary frequency that is non-synchronous with that of the color sub-carrier wave can be performed, similarly to the second embodiment.

Fourth and Fifth Embodiments

Figure 8:
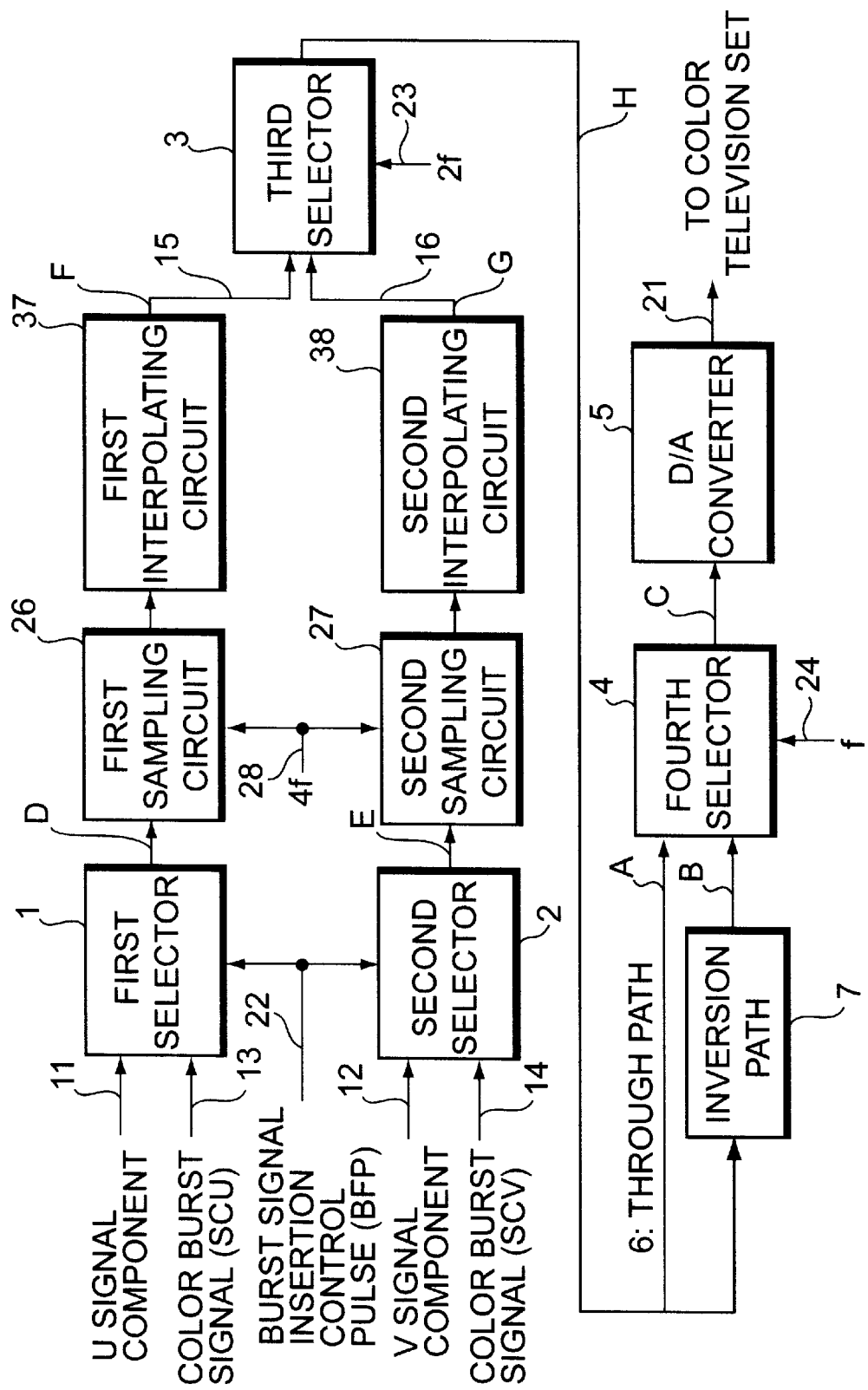
FIG. 8 is a block diagram showing the digital color signal modulating apparatus of the fourth embodiment.
Figure 9:
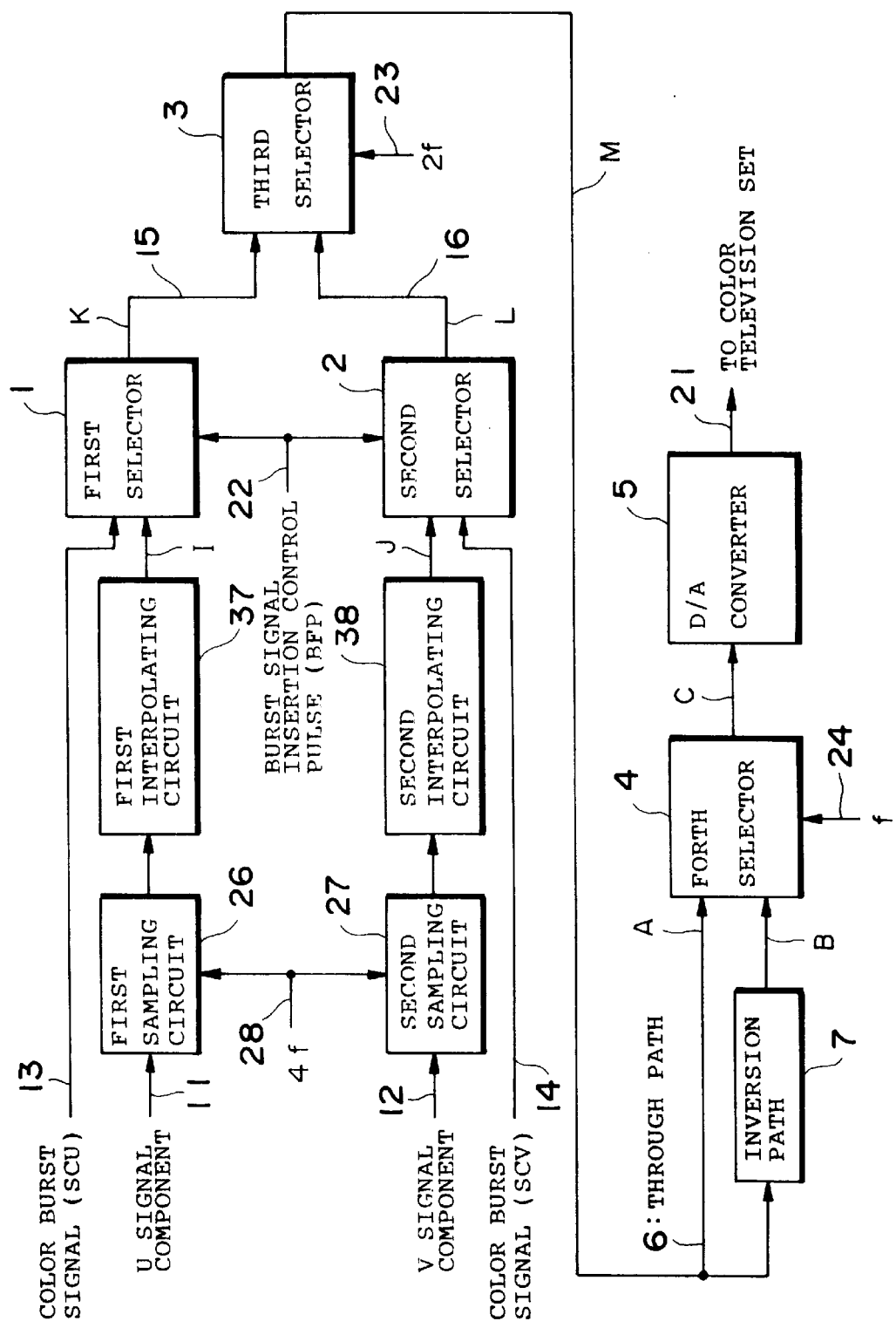
FIG. 9 is a block diagram showing the digital color signal modulating apparatus of the fifth embodiment.

FIG. 8 is a block diagram showing the digital color signal modulation apparatus of the fourth embodiment, and FIG. 9 is a block diagram showing the digital color signal modulation apparatus of the fifth embodiment. The former apparatus includes interpolating circuits 37 and 38 disposed after the sampling circuits 26 and 27, respectively. The interpolating circuits are well-known as an interpolation filter, and compare the levels of adjacent signal values to insert the average value or the middle value therebetween.

As shown in FIG. 9, the sampling circuits 26 and 27 sample the input signals at the frequency that is four times as high as that of the sub-carrier wave. However, for such sampling, the level of adjacent signal values are often changed unnaturally by the input signal, which determinates the output signal quality. That is why the interpolating filters 37 and 38 are laid after the sampling circuits 26 and 27, in order to correct the signal having level that changes rapidly. Such a correction is preferably performed after sampling in the sampling circuits 26 and 27. Accordingly, with the sampling circuits 26 and 27 positioned before of the first and second selectors 1 and 2, the first and second interpolating circuits 37 and 38 are positioned likewise.

Figure 10:
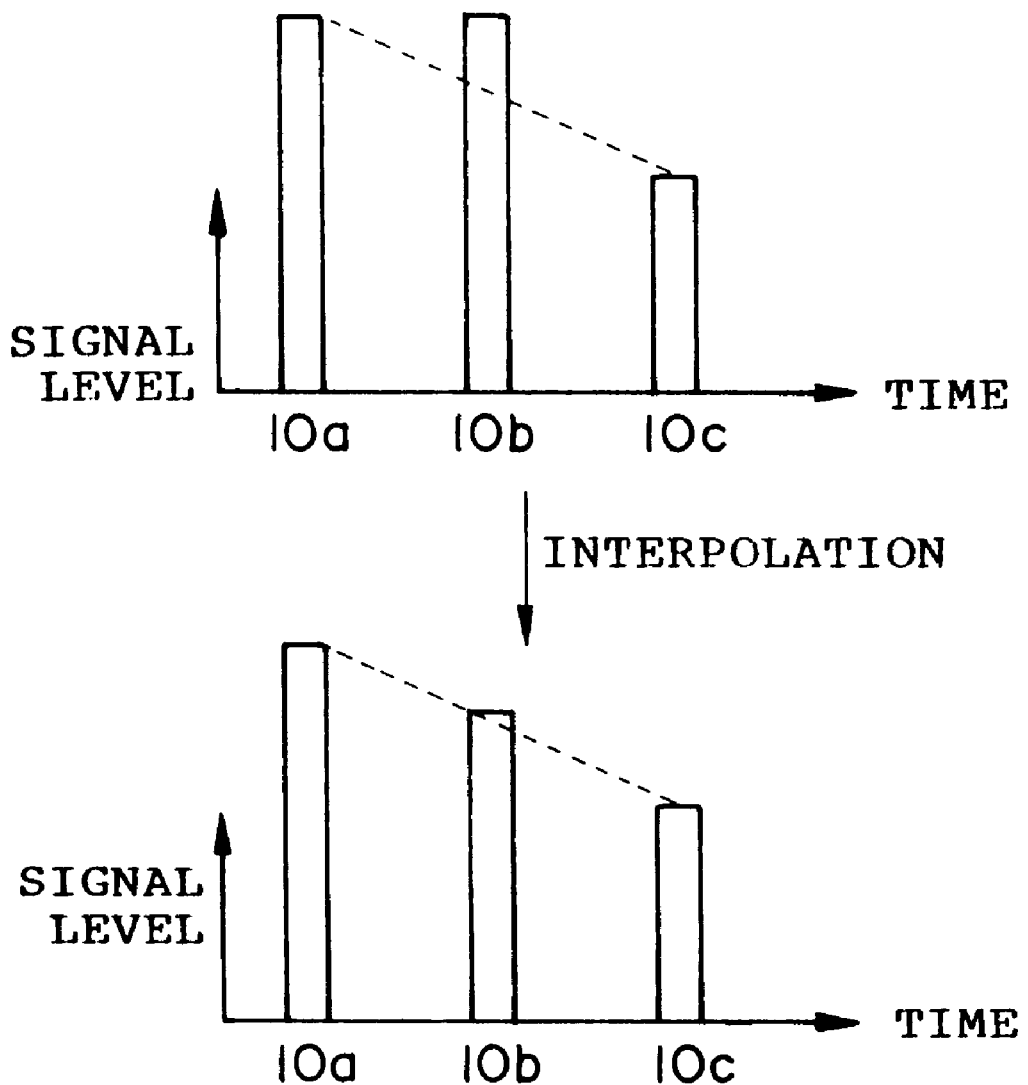
FIG. 10 is a diagram showing the operation of the fourth and fifth embodiments.

FIG. 10 is a diagram showing the operation of the digital color signal modulating apparatus of the fourth and fifth embodiments, in which the upper figure illustrates the non-interpolated signal level variation, and the lower figure illustrates the interpolated signal level variation. The diagram shows an example on sampling the input signal with a frequency lower than that of the sampling clock signal, wherein successive sampling of the signals 10*a* and 10*b* having levels that are the same as each other is followed by sampling the signal 10c having a level that is a little lower. The interpolating circuits 37, 38 smooth the sharp change between the signals 10b and 10c, thereby avoiding the determination of the image quality caused through sampling. More specifically, the circuits 37 and 38 replace the signal 10b which has caused the sharp change with the signal 10b' which makes the change moderate. The effect brought by sampling at the quadrupal frequency can be provided by sampling at double frequency and interpolating between adjacent signals.

According to fourth and fifth embodiments, modulating the input digital color signal synchronous with the clock signal having an arbitrary frequency can be easily performed, and in addition, the determination of the image quality caused through sampling can be avoided.

Furthermore, for an input signal with a low clock frequency, increasing the number of the data obtained through sampling and interpolating therebetween leads to modulation of a high quality image.

Sixth and Seventh Embodiments

Figure 11:
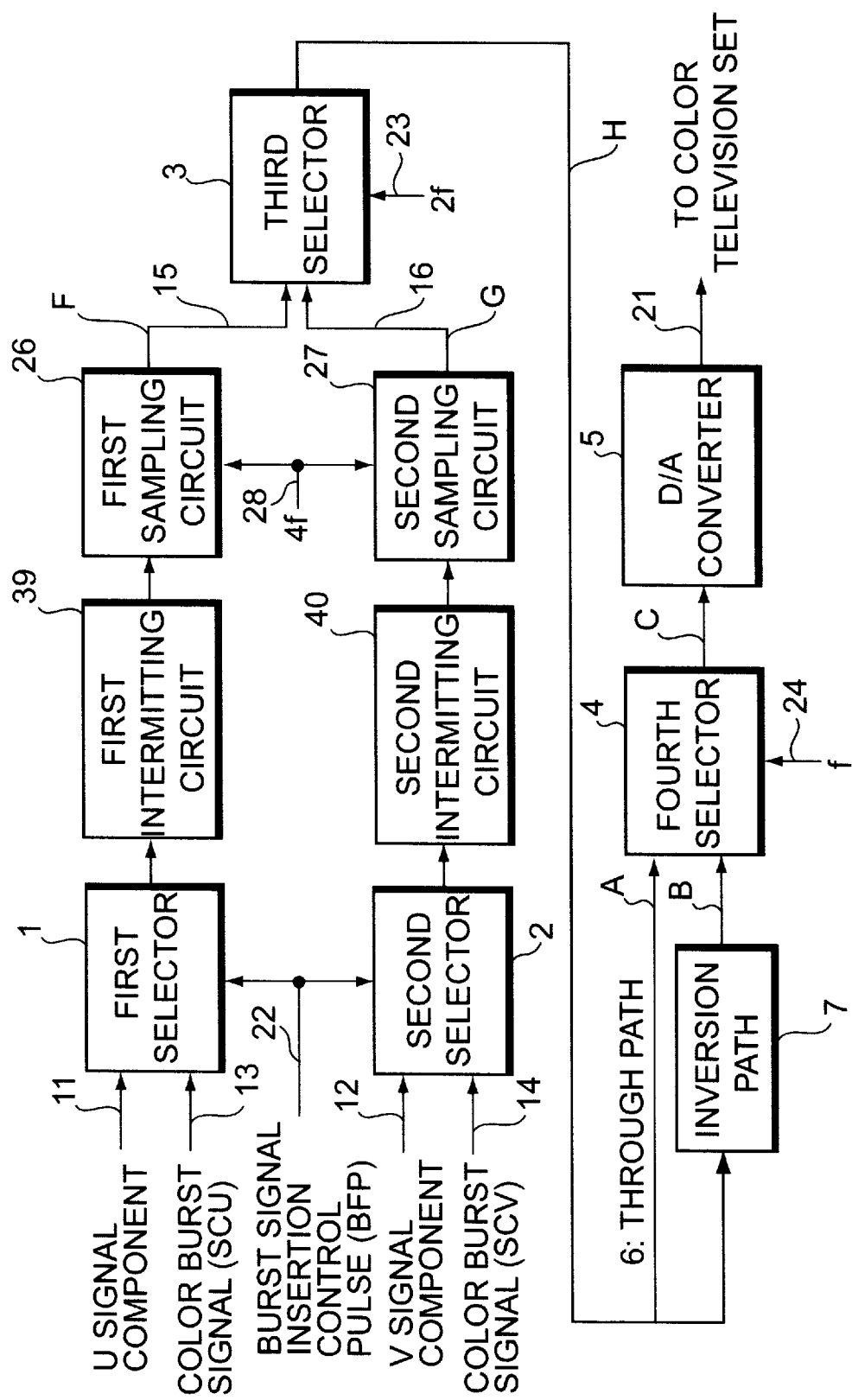
FIG. 11 is a block diagram showing the digital color signal modulating apparatus of the sixth embodiment.
Figure 12:
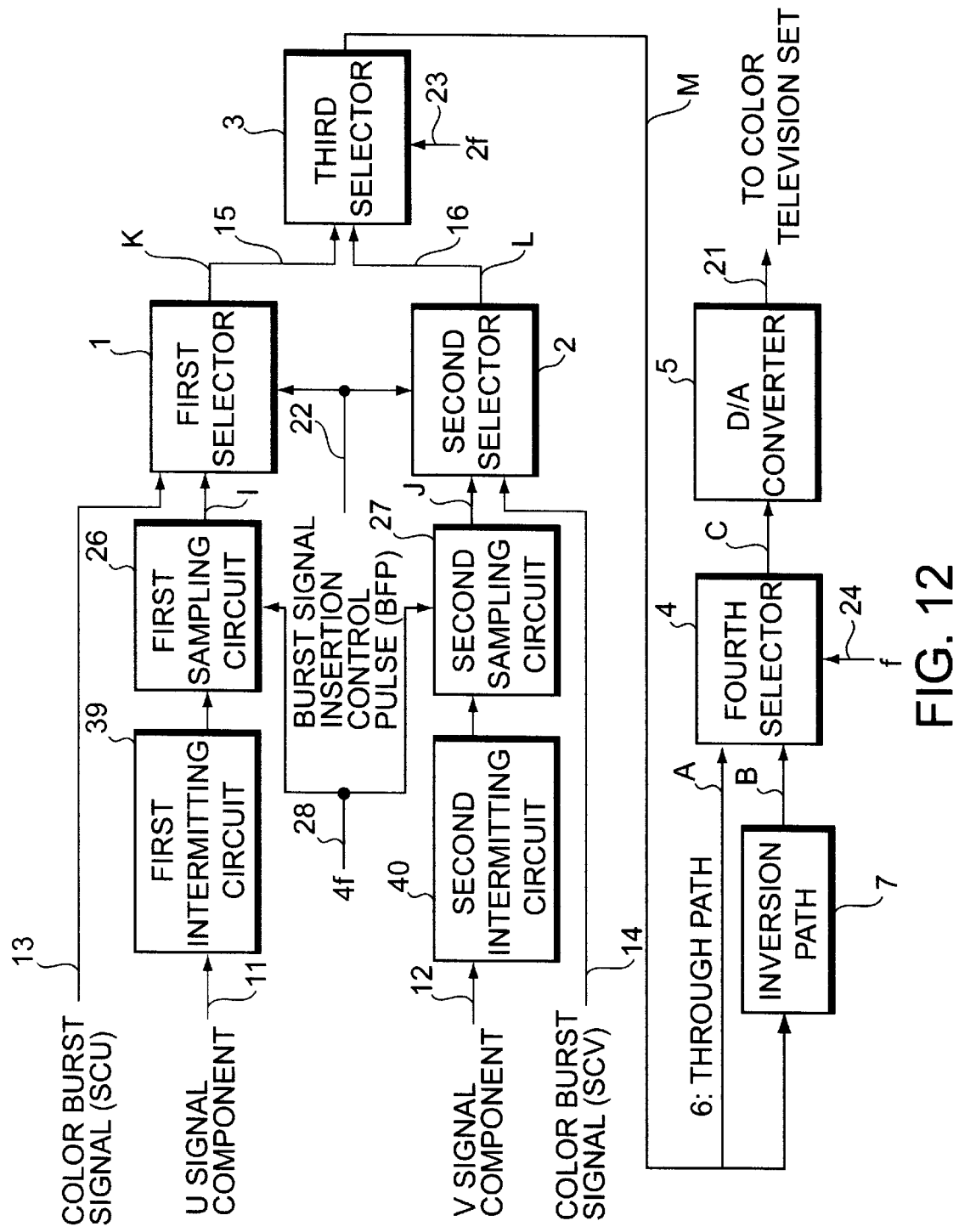
FIG. 12 is a block diagram showing the digital color signal modulating apparatus of the seventh embodiment.

FIGS. 11 and 12 are block diagrams showing the digital color signal modulating apparatus of the sixth and seventh embodiments of the present invention, respectively. The apparatus of the sixth embodiment includes the intermitting circuits 39 and 40 disposed before the sampling circuits 26 and 27. The intermitting circuits 39 and 40 are well-known as a decimation filter, which intermits the digital signal to smooth the levels of adjacent digital signal values. In short, such intermitting before sampling prevents some parts of the sampled signal from sharply changing in level.

The seventh embodiment shown in FIG. 12 is a modified example, where the sampling circuits 26 and 27 are disposed before the first and second selectors 1 with their functions and configurations similar to those of the sixth embodiment.

Though the apparatus in the fourth and fifth embodiments adjust the change in signal level after sampling, the apparatus in the sixth and seventh embodiments adjust the original signal by selection of the signal having a proper level. One of the former type and the latter type can be employed, according the characteristic of the input signal. In both cases, modulation of a high quality image can be easily realized.

Moreover, for a clock frequency of the input signal that is higher than the sampling frequency, the intermitting-g circuit selects the signal having a proper frequency and provides it to the sampling circuit, thus providing a modulated image of higher quality.

In addition, the apparatus of the fifth and seventh embodiments process the color burst signal using neither the interpolating circuit nor the intermitting circuit, each of which constitutes the apparatuses of the fifth and seventh embodiments and involves adjustment of the color burst signal levels. This permits the apparatus to be free of any effect of those circuits.

What is claimed is:

1. A digital color signal modulation apparatus, which converts a digital color signal to an analogue signal, comprising:
   a first selector, for receiving a U signal component and a first color burst signal, and for selecting one of the U signal component and the first color burst signal;
   a second selector, for receiving a V signal component and a second color burst signal, and for selecting one of the V signal component and the second color burst signal;
   a third selector for alternately selecting one of outputs of the first selector and the second selector in response to a first clock signal having a first frequency that is twice as high as a second frequency of a color sub-carrier wave;
   a through path for forwarding an output of the third selector;
   an inversion path for inverting a polarity of the output of the third selector in terms of analogue; and
   a fourth selector for alternately selecting one of outputs of the through path and the inversion path in response to a second clock signal having the second frequency;
   wherein the first and second clock signals are each single-bit signals that periodically alternate between two values.

2. A digital color signal modulation apparatus, which converts a digital color signal to an analogue signal, comprising:
   a first selector, for receiving a U signal component and a first color burst signal, and for selecting one of the U signal component and the first color burst signal;
   a second selector, for receiving a V signal component and a second color burst signal, and for selecting one of the V signal component and the second color burst signal;
   a first sampling circuit for sampling an output of the first selector in response to a first clock signal having a first frequency that is four times as high as a second frequency of a color sub-carrier wave;
   a second sampling circuit for sampling an output of the second selector in response to the first clock signal having the first frequency;
   a third selector for alternately selecting outputs of the first sampling circuit and the second sampling circuit in response to a third clock signal having a third frequency that is twice as high as the second frequency;
   a through path for forwarding an output of the third selector;
   an inversion path for inverting a polarity of the output of the third selector in terms of analogue; and
   a fourth selector for alternately selecting one of outputs of the through path and the inversion path in response to a second clock signal having the second frequency;
   wherein the first, second, and third clock signals are each single-bit signals that periodically alternate between two values.

3. The apparatus of claim 2 wherein the outputs of the first and second sampling circuits are synchronous with the first clock signal.

4. A digital color signal modulating apparatus, which converts a digital color signal to an analogue signal, comprising:
   a first sampling circuit for sampling a U signal component of the digital color signal in response to a first clock signal having a first frequency that is four times as high as a second frequency of a color sub-carrier wave;
   a first selector, for receiving an output of the first sampling circuit and a first color burst signal, and for selecting one of the output of the first sampling circuit and the first color burst signal;
   a second sampling circuit for sampling a V signal component of the digital color signal in response to the first clock signal having the first frequency;
   a second selector, for receiving an output of the second sampling circuit and a second color burst signal, for selecting one of the output of the second sampling circuit and the second color burst signal;

a third selector for alternately selecting one of outputs of the first selector and the second selector in response to a third clock signal having a third frequency that is twice as high as the second frequency;

a through path for forwarding an output of the third selector;

an inversion path for inverting a polarity of the output of the third selector in terms of analogue; and a fourth selector for alternately selecting one of outputs of the through path and the inversion path in response to a second clock signal having the second frequency;

wherein the first, second, and third clock signals are each single-bit signals that periodically alternate between two values.

5. The apparatus of claim 4 wherein the outputs of the first and second sampling circuits are synchronous with the first clock signal.

6. A digital color signal modulating apparatus, which converts a digital color signal to an analogue signal, comprising:

a first selector, for receiving a U signal component and a first color burst signal, and for selecting one of the U signal component and the first color burst signal;

a second selector, for receiving a V signal component and a second color burst signal, and for selecting one of the V signal component and the second color burst signal;

a first sampling circuit for sampling an output of the first selector in response to a first clock signal having a first frequency that is four times as high as a second frequency of a color sub-carrier wave;

a second sampling circuit for sampling an output of the second selector in response to the first clock signal having the first frequency;

a first interpolating circuit for adjusting a first change in level of an output of the first sampling circuit;

a second interpolating circuit for adjusting a second change in level of an output of the second sampling circuit;

a third selector for alternately selecting outputs of the first interpolating circuit and the second interpolating circuit in response to a third clock signal having a third frequency that is twice as high as the second frequency;

a through path for forwarding an output of the third selector;

an inversion path for inverting a polarity of the output of the third selector in terms of analogue; and a fourth selector for alternately selecting one of outputs of the through path and the inversion path in response to a second clock signal having the second frequency;

wherein the first, second, and third clock signals are each single-bit signals that periodically alternate between two values.

7. The apparatus of claim 6 wherein the outputs of the first and second sampling circuits are synchronous with the first clock signal.

8. A digital color signal modulating apparatus, which converts a digital color signal to an analogue signal, comprising:

a first sampling circuit for sampling a U signal component of the digital color signal in response to a first clock signal having a first frequency that is four times as high as a second frequency of the color sub-carrier wave;

a first interpolating circuit for adjusting a first change in level of an output of the first sampling circuit;

a first selector for selecting one of an output of the first interpolating circuit and a first color burst signal;

a second sampling circuit for sampling a V signal component of the digital color signal in response to the first clock signal having the first frequency;

a second interpolating circuit for adjusting a second change in level of an output of the second sampling circuit;

a second selector for selecting one of an output of the second interpolating circuit and a second color burst signal;

a third selector for alternately selecting outputs of the first selector and the second selector in response to a third clock signal having a third frequency that is twice as high as the second frequency;

a through path for forwarding an output of the third selector;

an inversion path for inverting a polarity of the output of the third selector in terms of analogue; and a fourth selector for alternately selecting one of outputs of the through path and the inversion path in response to a second clock signal having the second frequency;

wherein the first, second, and third clock signals are each single-bit signals that periodically alternate between two values.

9. The apparatus of claim 8 wherein the outputs of the first and second sampling circuits are synchronous with the first clock signal.

10. A digital color signal modulating apparatus, which converts a digital color signal to an analogue signal, comprising:

a first selector, for receiving a U signal component and a first color burst signal, and for selecting one of the U signal component and the first color burst signal;

a second selector, for receiving a V signal component and a second color burst signal, and for selecting one of the V signal component and the second color burst signal;

a first intermitting circuit for smoothing levels of an output of the first selector;

a first sampling circuit for sampling an output of the first intermitting circuit in response to a first clock signal having a first frequency that is four times as high as a second frequency of a color sub-carrier;

a second intermitting circuit for smoothing levels of the output of the second selector;

a second sampling circuit for sampling an output of the second intermitting circuit in response to the first clock signal having the first frequency;

a third selector for alternately selecting one of outputs of the first sampling circuit and the second sampling circuit in response to a third clock signal having a third frequency that is twice as high as the second frequency;

a through path for forwarding an output of the third selector;

an inversion path for inverting a polarity of the output of the third selector in terms of analogue; and a fourth selector for alternately selecting one of outputs of the through path and the inversion path in response to a second clock signal having the second frequency;

wherein the first, second, and third clock signals are each single-bit signals that periodically alternate between two values.

11. The apparatus of claim 10 wherein the outputs of the first and second sampling circuits are synchronous with the first clock signal.

12. A digital color signal modulating apparatus, which converts a digital color signal to an analogue signal, comprising:

a first intermitting circuit for smoothing levels of adjacent signals in a U signal component of the digital color signal;

a first sampling circuit for sampling an output of the first intermitting circuit in response to a first clock signal having a first frequency that is four times as high as a second frequency of a color sub-carrier;

a first selector for selecting one of an output of the first sampling circuit and a first color burst signal;

a second intermitting circuit for smoothing levels of adjacent signals in a V signal component of the digital color signal;

a second sampling circuit for sampling an output of the second intermitting circuit in response to the first clock signal having the first frequency;

a second selector for selecting one of an output of the second sampling circuit and a second color burst signal;

a third selector for alternately selecting one of outputs of the first selector and the second selector in response to a third clock signal having a third frequency that is twice as high as the second frequency;

a through path for forwarding an output of the third selector;

a inversion path for inverting a polarity of the output of the third selector in terms of analogue; and a fourth selector for alternately selecting one of outputs of the through path and the inversion path in response to a second clock signal having the second frequency;

wherein the first, second, and third clock signals are each single-bit signals that periodically alternate between two values.

13. The apparatus of claim 12 wherein the outputs of the first and second sampling circuits are synchronous with the first clock signal.

* * * * *